March 5, 1946. L. W. HUBBELL Re. 22,729

CLIP TYPE EARRING

Original Filed Dec. 18, 1943

Inventor

LESLIE W. HUBBELL

By Samuel Klowitz

Attorney

Reissued Mar. 5, 1946

Re. 22,729

UNITED STATES PATENT OFFICE 22,729

CLIP TYPE EARRING

Leslie W. Hubbell, Cheshire, Conn., assignor to The Ball & Socket Manufacturing Co., West Cheshire, Conn., a corporation of Connecticut Original No. 2,377,688, dated June 5, 1945, Serial No. 514,827, December 18, 1943. Application for reissue September 21, 1945, Serial No. 617,940

9 Claims. (Cl. 63—20)

This invention relates to clips and more particularly to a type useful in nonpiercing earrings.

It is the object of the present invention to provide a clip construction for earrings which is rugged and economical and which may be worn with comfort and with certainty of retention over long periods of time.

It is a further object of the present invention to adapt conventional button backs for the reception thereby of a resilient metallic wire clip to attain a resilient clip assembly which may be worn with comfort upon the earl lobes. The invention comprehends the combination of all types of ornamental surfaces with metallic button backs in accordance with the present invention, so that earrings of all types may be had by different combinations of ornamental fronts with the metallic backs such as ornamental button shells of metal, plastics, fabric or cabochons of all types.

The invention proceeds upon the principle of providing a channel functioning as a pivotal seat for a spring clip by stamping this channel in the button back at one side of the center thereof, which may be executed at the time of manufacture of the button back as a part of the original stamping operation, and which may be supplemented by the stamping of a protuberance at the opposite side of the center of the button at the point of engagement of the end of the resilient clip to obtain a more perfect gripping action between the clip and button back. Ornamental surfaces of all types may be combined with the metal back by spinning an ornamental button shell around the flange of the button back, or by pressing the flange of the button back around the ornamental shell of metal or around an insert of any other material such as cabochons of all types well known in the jewelry art. A special spring clip of resilient metal wire having bifurcated arms terminating in inwardly extending trunnions is engaged in the pivotal seat formed by the channel by spreading the arms slightly until the transversely extending trunnions extend into the opposite ends of the channel. These ends of the channel are tapered toward each other and towards the center of the button back in order to spreads the sides of the spring clip when the latter is pivoted from the plane of the button back, which spreading of the arms acts against the resilient force of the spring wire material to remain in undistended position, whereupon the release of the pivoting force causes the clip to return to its normal position with the junction end of the bifurcated clip adjacent to the button back.

It is a further object of the invention to provide an economical clip construction which requires no soldering, or the handling of sealing plastics or complicated spring structures to adapt a conventional button back for use as a clip which may be used as an earring or other ornament independent of, or in supplement to, a conventional set of buttons having similar ornamentation.

Other objects and purposes will appear from the more detailed description of the invention following hereinafter, taken in conjunction with the accompanying drawing, wherein Fig. 1 is a front elevation of a button back in accordance with the present invention;

Figure 1:
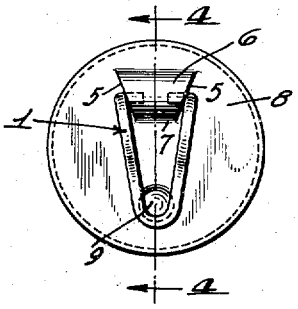
Figure 2:
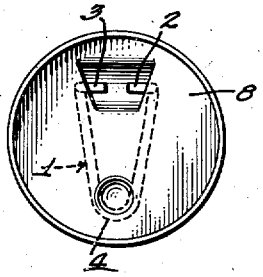
Fig. 2 is a rear view of Fig. 1.
Figure 3:
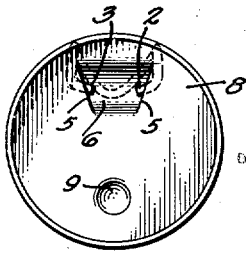
Fig. 3 is a rear view corresponding to Fig. 2 showing the clip in raised position, at which time it exerts its tendency to return to its position shown in Fig. 1.

In Figs. 1 to 4 of the drawing is shown a conventional circular metallic button back 8 which preferably is adapted to be stamped from metal sheeting with a surrounding flange 18 and which, in addition, has a trapezoidal channel 6 stamped outwardly from the rear surface thereof terminating in spaced convergingly directed slits 5 which taper towards the center of the button. This trapezoidal channel is stamped at one side of the center of the button back along a chordal line of the circular back and the slits taper towards the opposite side of the center line so that the minor parallel side 7 of the trapezoid is closer to the center of the button back. A bifurcated spring clip 1 of tempered steel or brass wire, as shown in enlarged scale in Fig. 5, is provided with two arms 2', 3', which terminate in inwardly extending trunnions 2 and 3 and have a common junction point 4. The trunnions 2, 3 are inserted into the channel 6 through slits 5 by a slight spreading of the arms 2' and 3'. Normally the clip tends to abut the button back, and in order to perfect this abutting action, a small protuberance 9 is stamped outwardly of the button back at the same time that the channel 6 is stamped therefrom. The protuberance 9 is disposed equidistantly from the ends of the channel 6 in the vertical center of the button back. Thereupon a more complete and lasting resilient engagement is had between the junction end 4 of the clip and the button back.

Figure 4:
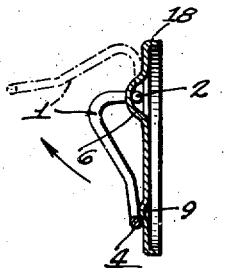
Fig. 4 is a vertical sectional view along line 4—4 of Fig. 1 with the clip shown in solid lines in its normal position, and in dotted lines in its raised position.
Figure 5:
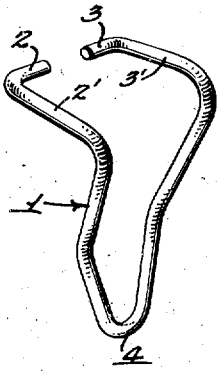
Fig. 5 is a perspective view of the spring clip element which may be used with the button back in accordance with the present invention to complete the economical and rugged assembly.

When the clip 1 is pivoted around its trunnions in the channel 6, as indicated by the arrow in Fig. 4, the arms 2' and 3' move towards the wider portion of the channel by the camming action of the end edges or slits 5 to effect a spreading of the arms. The resilience of the arms is such that a force is exerted to return the clip to its normal position, which is done when the raising force is released, so that the lobe of an ear may be comfortably engaged between the clip 1 and the button back 8. The clip is so shaped that a partial spacing of the end 4 from the protuberance 9 results in a sufficient space for the accommodation of an ear lobe. Furthermore, the channel 6 is disposed inwardly of the circumference so that no part of the clip is visible when the same is worn, while the extent of clip contact from adjacent one end of the button to the other results in an effective gripping action with maximum comfort to the wearer.

Figure 6:
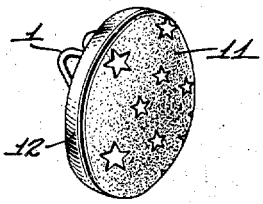
Fig. 6 is a perspective view of the finished earring in accordance with the present invention, illustrating an ornamental metallic button shell having the flange thereof surrounding the flange of the metallic back.

Fig. 6 shows an ornamental button shell 11 which may be of sheet metal or plastic, having a flange 12 spun around the flange of the button back.

Figure 7:
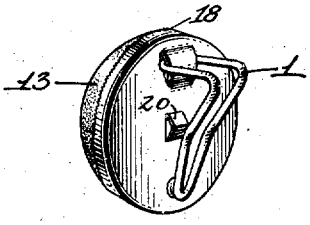
Fig. 7 is a perspective view of a different form of the invention showing the applicability of the invention to button backs which are also adapted to be used as conventional buttons.

In Fig. 7 is shown a cabochon 13 which may be of plastic, onyx or any other ornamental material, which is adapted to be crimped by the flange 13 of the button back. In this view is shown as well, a conventional buttonhole channel 20 which may be pressed into the button back in supplement to the channel 6 and protuberance 9, in order that the back may be adapted to alternative uses as a conventional button or as a clip.

Figure 8:
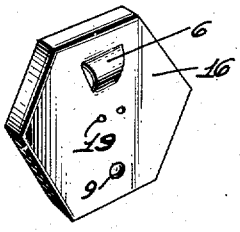
Fig. 8 is a perspective view of a button back of a different geometrical configuration showing the alternate adaptability of the back to be used as a button or as a clip.

In Fig. 8 is shown a button back 16 of hexagonal configuration having the pivotal channel seat 6 and protuberance 9 stamped therein in supplement to the buttonholes 19, so that the back may be used alternately as a clip or as a button. The invention may be applied as well to button backs of any geometric configuration or design.

It is understood that while the invention is particularly applicable to the adaptability of conventional metallic button backs to the use of earrings, the features thereof may as well be applied to other jewelry clips of an ornamental nature, or to other utilitarian clips. Also the resilient clip may be applied to backs of sheet material functioning in the same manner as sheet metal backs, which are extensively used at the present time. While I have described my invention as embodied in a specific form and as operating in a specific manner for purposes of illustration, it should be understood that I do not limit my invention thereto, since various modifications will suggest themselves to those skilled in the art without departing from the spirit of my invention, the scope of which is set forth in the annexed claims.

I claim:

1. An earring of the clip type comprising a back and an ornamental front mounted thereon, said back having a pair of spaced convergingly directed slits cut therein and the material between displaced from the plane of said back, said slits being disposed at one side of the center of said back and tapering towards each other towards the opposite side of said center of said back, and a bifurcated resilient clip formed of spring wire having arms terminating in transversely extending trunnions pivotally engaging said displaced material with the junction end of said arms normally adapted to abut the back, said last-mentioned end adapted to press resiliently towards said back when said clip is moved pivotally from said back, in consequence of the tensioning of the arms thereof by the engagement of said arms with the differently spaced portions of the back between said slits.

2. An earring of the clip type comprising a metallic back and an ornamental front mounted thereon, said metallic back having a channel and a pair of spaced slits at the ends thereof pressed outwardly from the surface of said metallic back, said channel being disposed at one side of the center of said back and said slits tapering towards each other towards the opposite side of said center of said back, a small protuberance pressed outwardly from the surface of the metallic back at said last-mentioned side thereof and equidistantly of the ends of said channel, and a bifurcated resilient clip formed of metallic spring wire having arms terminating in inwardly extending trunnions pivotally engaging said channel through said slits, with the junction end of said arms normally adapted to abut said protuberance on the metallic back, said last-mentioned end adapted to press resiliently towards said protuberance when said slip is moved pivotally from said back, in consequence of the spreading of the arms thereof by the engagement of said arms with the wider portion of said channel.

3. An earring of the clip type comprising a circular metallic back and an ornamental front mounted thereon, said metallic back having a pair of spaced slits stamped therein to define the boundaries of a trapezoidal channel pressed outwardly from the surface of said metallic back along a chordal line of said circular back symmetrically with respect to the vertical center of said back and with the minor parallel side of said trapezoidal channel being closer to said center, a bifurcated resilient clip formed of metallic spring wire having arms terminating in inwardly extending trunnions pivotally engaging said channel through said slits with the junction end of said arms normally adapted to abut the metallic back at a point in the vertical center of said back opposite said chordal line, said last-mentioned end adapted to press resiliently towards said metallic back when said clip is moved pivotally from said back in consequence of the spreading of the arms thereof by the engagement of said arms with the wider portion of said trapezoidal channel adjacent to the major parallel side thereof.

4. A device as set forth in claim 3 wherein a small protuberance is pressed outwardly from the surface of the metallic back at said point in the vertical center of said back opposite said chordal line to accentuate the resilient engagement between the junction end of said resilient clip and the metallic back.

5. A resilient clip assembly comprising a metallic backing element, said element having a channel and a pair of spaced slits at the ends thereof pressed outwardly from the surface of said element, said channel being disposed at one side of the center of said element and said slits tapering towards each other towards the opposite side of said center of said element, and a bifurcated resilient clip formed of metallic spring wire having arms terminating in inwardly extending trunnions pivotally engaging said channel through said slits whereby the clip may be swung approximately 90° from the backing element, with the junction end of said arms normally adapted to abut the metallic backing element, said last-mentioned end adapted to return automatically towards said backing element when said clip is moved pivotally from said element in consequence of the spreading of the arms thereof by the engagement of said arms with the wider portion of said channel.

6. A resilient clip assembly comprising a metallic back and an ornamental front mounted thereon, said metallic back having a channel and a pair of spaced slits at the ends thereof pressed outwardly from the surface of said metallic back, said channel being disposed at one side of the center of said back and said slits tapering towards each other towards the opposite side of said center of said back, a small protuberance pressed outwardly from the surface of the metallic back at said last-mentioned side thereof and equidistantly of the ends of said channel, and a bifurcated resilient clip formed of metallic spring wire having arms terminating in inwardly extending trunnions pivotally engaging said channel through said slits whereby the clip may be swung approximately 90° from the plane of the metallic back, with the junction end of said arms normally adapted to abut said protuberance on said metallic back, said last-mentioned end adapted to return automatically towards said metallic back when said clip is moved pivotally in said channel in consequence of the spreading of the arms thereof by the engagement of said arms with the ends of the wider portion of said channel.

7. A resilient clip assembly comprising a backing element of sheet material having a pair of convergingly directed camming slits stamped from the surface of said backing element and forming camming edges displaced from the plane of said backing element, and a bifurcated resilient clip formed of spring wire having arms terminating in transversely extending trunnions adapted to fit resiliently into said camming slits and normally adjacent to the surface of said backing element with the junction of said arms normally abutting said backing element, said last-mentioned junction adapted to press resiliently towards the surface of said backing element when said clip is moved pivotally therefrom, in consequence of the opposition of the natural resilience of said arms to the enforced movement of said arms by said camming edges.

8. An earring of the clip type comprising a back and an ornamental front mounted thereon, said back having a pair of spaced convergingly directed slits cut therein to form camming edges and the material between displaced from the plane of said back, and a bifurcated resilient clip formed of spring wire having arms terminating in transversely extending trunnions pivotally engaging said back adjacent to said slits with the junction end of said arms normally adapted to abut the back, said last-mentioned end adapted to press resiliently towards said back when said clip is moved pivotally from said back, in consequence of the tensioning of the arms thereof by the engagement of said arms with said camming edges.

9. A resilient clip assembly comprising a backing element of sheet material having a pair of convergingly directed camming slits cut in said backing element and forming camming edges at said slits, and a bifurcated resilient clip formed of spring wire having arms terminating in transversely extending trunnions adapted to fit resiliently into said camming slits and normally adjacent to the surface of said backing element with the junction of said arms normally abutting said backing element, said last-mentioned junction adapted to press resiliently towards the surface of said backing element when said clip is moved pivotally therefrom, in consequence of the opposition of the natural resilience of said arms to the enforced movement of said arms by said camming edges.

LESLIE W. HUBBELL.